US006722441B2

(12) United States Patent
Lauritzen et al.

(10) Patent No.: US 6,722,441 B2
(45) Date of Patent: Apr. 20, 2004

(54) THREADED APPARATUS FOR SELECTIVELY TRANSLATING ROTARY EXPANDER TOOL DOWNHOLE

(75) Inventors: J. Eric Lauritzen, Kingwood, TX (US); Mike A. Luke, Houston, TX (US); Dale Norman, Spring, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 20 days.

(21) Appl. No.: 10/034,592

(22) Filed: Dec. 28, 2001

(65) Prior Publication Data

US 2003/0121655 A1 Jul. 3, 2003

(51) Int. Cl.$^7$ ............................................. E21B 43/10
(52) U.S. Cl. ..................................... 166/380; 166/207
(58) Field of Search ............................. 166/380, 384, 166/207, 297, 137, 195, 217

(56) References Cited

U.S. PATENT DOCUMENTS

| 761,518 A | 5/1904 | Lykken |
| 1,324,303 A | 12/1919 | Carmichael |
| 1,545,039 A | 7/1925 | Deavers |

(List continued on next page.)

FOREIGN PATENT DOCUMENTS

| EP | 0 961 007 | 12/1999 | ............ E21B/33/10 |
| GB | 2 252 582 | 8/1992 | ............ E21B/34/06 |
| GB | 2 320 734 | 7/1998 | .......... E21B/33/127 |
| GB | 2 345 308 A | 7/2000 | ............ E21B/43/10 |
| WO | WO 93/24728 | 12/1993 | ............ E21B/17/10 |
| WO | WO 99/18328 | 4/1999 | ............ E21B/23/01 |
| WO | WO 99/23354 | 5/1999 | ............ E21B/43/10 |
| WO | WO 00/37766 | 6/2000 | ............ E21B/29/00 |
| WO | WO 00/37767 | 6/2000 | ............ E21B/29/00 |
| WO | WO 00/37768 | 6/2000 | ............ E21B/29/10 |
| WO | WO 00/37772 | 6/2000 | ............ E21B/43/10 |
| WO | WO 00/37773 | 6/2000 | ............ E21B/43/10 |
| WO | WO 01/38689 | 5/2001 | ............ E21B/23/00 |
| WO | WO 01/60545 A1 | 8/2001 | ............ B21D/39/00 |

OTHER PUBLICATIONS

PCT International Search Report, International Application No. PCT/GB 02/05897, dated Apr. 4, 2003.
International Search Report, International Application No. PCT/GB 02/03827, dated Dec. 4, 2002.

(List continued on next page.)

*Primary Examiner*—William Neuder
(74) *Attorney, Agent, or Firm*—Moser, Patterson & Sheridan, L.L.P.

(57) ABSTRACT

An apparatus for translating an expander tool within a wellbore. The apparatus enables an expander tool to be moved axially within a wellbore during an expansion operation without raising or lowering the working string during the expansion operation. In one aspect, the apparatus comprises a shaft, a nut member which rides along the shaft when the shaft is rotated, and a recess connected to the nut member for receiving the shaft as the nut member travels axially along the shaft. The expander tool is connected at an end to the nut member such that translation of the nut member along the shaft serves to translate the expander tool axially within the wellbore. In one aspect, the shaft employs helical threads for incrementally advancing the nut member upon rotation of the shaft. In a further aspect, the apparatus includes a nut housing for holding the nut member, and a key member disposed within the circumference of the nut and the nut housing. The key member extends into a spline fabricated into the inner surface of the tubular to be expanded, such as a lower string of casing, to maintain the nut member in a non-rotational manner during rotation of the shaft.

30 Claims, 8 Drawing Sheets

U.S. PATENT DOCUMENTS

| | | | | |
|---|---|---|---|---|
| 1,561,418 | A | 11/1925 | Duda | |
| 1,569,729 | A | 1/1926 | Duda | |
| 1,597,212 | A | 8/1926 | Spengler | |
| 1,930,825 | A | 10/1933 | Raymond | |
| 2,383,214 | A | 8/1945 | Prout | 153/82 |
| 2,499,630 | A | 3/1950 | Clark | 153/81 |
| 2,627,891 | A | 2/1953 | Clark | 153/82 |
| 2,663,073 | A | 12/1953 | Bieber et al. | 29/148 |
| 2,898,971 | A | 8/1959 | Hempel | 153/82 |
| 3,087,546 | A | 4/1963 | Wooley | 166/46 |
| 3,195,646 | A | 7/1965 | Brown | 166/208 |
| 3,208,531 | A | 9/1965 | Tamplen | 166/125 |
| 3,467,180 | A | 9/1969 | Pensotti | 165/180 |
| 3,776,307 | A | 12/1973 | Young | 166/125 |
| 3,818,734 | A | 6/1974 | Bateman | 72/75 |
| 3,911,707 | A | 10/1975 | Minakov et al. | 72/76 |
| 3,948,321 | A * | 4/1976 | Owen et al. | 166/277 |
| 4,069,573 | A | 1/1978 | Rogers, Jr. et al. | 29/421 R |
| 4,099,400 | A * | 7/1978 | Schott | 72/122 |
| 4,127,168 | A | 11/1978 | Hanson et al. | 166/123 |
| 4,159,564 | A | 7/1979 | Cooper, Jr. | 29/727 |
| 4,288,082 | A | 9/1981 | Setterberg, Jr. | 277/125 |
| 4,324,407 | A | 4/1982 | Upham et al. | 277/27 |
| 4,429,620 | A | 2/1984 | Burkhardt et al. | 91/395 |
| 4,531,581 | A | 7/1985 | Pringle et al. | 166/120 |
| 4,588,030 | A | 5/1986 | Blizzard | 166/120 |
| 4,697,640 | A | 10/1987 | Szarka | 166/120 |
| 4,848,469 | A | 7/1989 | Baugh et al. | 166/382 |
| 5,271,472 | A | 12/1993 | Leturno | 175/107 |
| 5,398,754 | A | 3/1995 | Dinhoble | 166/117.6 |
| 5,409,059 | A | 4/1995 | McHardy | 166/208 |
| 5,409,060 | A | 4/1995 | Carter | 166/237 |
| 5,435,400 | A | 7/1995 | Smith | 175/61 |
| 5,472,057 | A | 12/1995 | Winfree | 175/57 |
| 5,533,573 | A | 7/1996 | Jordan, Jr. et al. | 166/313 |
| 5,560,426 | A | 10/1996 | Trahan et al. | 166/120 |
| 5,685,369 | A | 11/1997 | Ellis et al. | 166/195 |
| 5,901,787 | A | 5/1999 | Boyle | 166/135 |
| 6,012,516 | A | 1/2000 | Brunet | 166/50 |
| 6,021,850 | A | 2/2000 | Wood et al. | 166/380 |
| 6,098,717 | A | 8/2000 | Bailey et al. | 166/382 |
| 6,186,233 | B1 | 2/2001 | Brunet | 166/298 |
| 6,325,148 | B1 | 12/2001 | Trahan et al. | 166/297 |
| 6,488,095 | B2 | 12/2002 | Buytaert | 166/382 |
| 2001/0045284 | A1 | 11/2001 | Simpson et al. | 166/313 |

OTHER PUBLICATIONS

U.S. patent application Ser. No. 10/267,025, Tran et al., filed Oct. 8, 2002.

U.S. patent application Ser. No. 10/253,114, Maguire et al., filed Sep. 24, 2002.

U.S. patent application Ser. No. 09/470,176, Metcalfe et al., filed Dec. 22, 1999.

U.S. patent application Ser. No. 09/469,692, Trahan, filed Dec. 22, 1999.

U.S. patent application Ser. No. 09/469,690, Abercrombie, filed Dec. 22, 1999.

U.S. patent application Ser. No. 09/469,643, Metcalfe et al., filed Dec. 22, 1999.

U.S. patent application Ser. No. 09/469,526, Metcalfe et al., filed Dec. 22, 1999.

U.S. patent application Ser. No. 09/470,154, Metcalfe et al., filed Dec. 22, 1999.

U.S. patent application Ser. No. 09/469,681, Metcalfe et al., filed Dec. 22, 1999.

U.S. patent application Publication, Baugh, et al., Pub. No.: US 2001/0020532, Pub. date: Sep. 13, 2001, "Hanging Liners by Pipe Expansion," filed: May 3, 2001.

* cited by examiner

THREADED APPARATUS FOR SELECTIVELY TRANSLATING ROTARY EXPANDER TOOL DOWNHOLE

BACKGROUND OF THE INVENTION

1. Field of the Invention

The present invention relates to methods for wellbore completion. More particularly, the invention relates to an apparatus for selectively translating a completion tool, such as an expander tool, downhole.

2. Description of the Related Art

Hydrocarbon and other wells are completed by forming a borehole in the earth and then lining the borehole with steel pipe or casing to form a wellbore. After a section of wellbore is formed by drilling, a section of casing is lowered into the wellbore and temporarily hung therein from the surface of the well. Using apparatus known in the art, the casing is cemented into the wellbore by circulating cement into the annular area defined between the outer wall of the casing and the borehole. The combination of cement and casing strengthens the wellbore and facilitates the isolation of certain areas of the formation behind the casing for the production of hydrocarbons.

It is common to employ more than one string of casing in a wellbore. In this respect, a first string of casing is set in the wellbore when the well is drilled to a first designated depth. The first string of casing is hung from the surface, and then cement is circulated into the annulus behind the casing. The well is then drilled to a second designated depth, and a second string of casing, or liner, is run into the well. The second string is set at a depth such that the upper portion of the second string of casing overlaps the lower portion of the first string of casing. The second liner string is then fixed or "hung" off of the existing casing by the use of slips which utilize slip members and cones to wedgingly fix the new string of liner in the wellbore. The second casing string is then cemented. This process is typically repeated with additional casing strings until the well has been drilled to total depth. In this manner, wells are typically formed with two or more strings of casing of an ever decreasing diameter.

Apparatus and methods are emerging that permit tubulars to be expanded in situ. The apparatus typically includes expander tools which are fluid powered and are run into the wellbore on a working string. The hydraulic expander tools include radially expandable members which, through fluid pressure, are urged outward radially from the body of the expander tool and into contact with a tubular therearound. As sufficient pressure is generated on a piston surface behind these expansion members, the tubular being acted upon by the expansion tool is expanded past its point of elastic deformation. In this manner, the inner and outer diameter of the tubular is increased in the wellbore. By rotating the expander tool in the wellbore and/or moving the expander tool axially in the wellbore with the expansion member actuated, a tubular can be expanded into plastic deformation along a predetermined length in a wellbore.

Multiple uses for expandable tubulars are being discovered. For example, an intermediate string of casing can be hung off of a string of surface casing by expanding an upper portion of the intermediate string into frictional contact with the lower portion of surface casing therearound. This allows for the hanging of a string of casing without the need for a separate slip assembly as described above. Additional applications for the expansion of downhole tubulars exist. These include the use of an expandable sand screen, employment of an expandable seat for seating a diverter tool, and the use of an expandable seat for setting a packer.

There are problems associated with the expansion of tubulars. One problem particularly associated with the use of rotary expander tools is the likelihood of obtaining an uneven expansion of a tubular. In this respect, the inner diameter of the tubular that is expanded tends to initially assume the shape of the compliant rollers of the expander tool, including imperfections in the rollers. Moreover, as the working string is rotated from the surface, the expander tool may temporarily stick during expansion of a tubular, then turn quickly, and then stop again. This spring-type action in the working string further creates imperfections in the expansion job.

Another obstacle to smooth expansion relates to the phenomenon of pipe stretch. Those of ordinary skill in the art will understand that raising a working string a selected distance at the surface does not necessarily translate in the raising of a tool at the lower end of a working string by that same selected distance. The potential for pipe stretch is great during the process of expanding a tubular. Once the expander tool is actuated at a selected depth, an expanded profile is created within the expanded tubular. This profile creates an immediate obstacle to the raising or lowering of the expander tool. Merely raising the working string a few feet from the surface will not, in many instances, result in the raising of the expander tool; rather, it will only result in stretching of the working string. Applying further tensile force in order to unstick the expander tool may cause a sudden recoil, causing the expander tool to move uphole too quickly, leaving gaps in the tubular to be expanded.

The same problem exists in the context of pipe compression. In this respect, the lowering of the working string from the surface does not typically result in a reciprocal lowering of the expander tool at the bottom of the hole. This problem is exacerbated by rotational sticking, as discussed above. The overall result of these sticking problems is that the inner diameter of the expanded tubular may not have a uniform circumference.

There is a need, therefore, for an improved apparatus for expanding a portion of casing or other tubular within a wellbore. Further, there is a need for an apparatus which will aid in the expansion of a tubular downhole and which avoids the potential of pipe-stretch/pipe-compression by the working string. Correspondingly, there is a need for a method for expanding a tubular which avoids the risk of uneven expansion of the tubular caused by pipe-stretch incident to raising the working string. Still further, a need exists for an apparatus which will selectively translate a completion tool such as a rotary expander axially downhole without requiring that the working string be raised or lowered.

There is yet a further need for an apparatus which translates a rotary expander tool along a threaded shaft by rotation of the shaft.

SUMMARY OF THE INVENTION

The present invention provides an apparatus and method for selectively translating a completion tool, such as an expander tool, downhole. According to the present invention, an expansion assembly is introduced into a wellbore. The expansion assembly is lowered downhole on a working string. At the same time, the expansion assembly is releasably connected to the lower string of casing or other tubular to be expanded. In this way, the expandable tubular is lowered into the wellbore by the working string as well.

The expansion assembly first comprises a rotary expander tool. The expander tool includes compliant rollers which are expandable outwardly against the inner surface of the tubular upon actuation. The expansion assembly further comprises an elongated threaded body, such as an externally threaded shaft, aligned co-axially within the wellbore and connected to the expander tool. Rotation of the working string causes both the threaded shaft and the expander tool to rotate. The expansion assembly further comprises a nut member which is bearingly connected to an end of the expander tool. The nut member is stationary, meaning that it does not rotate within the expansion assembly. However, rotation of the threaded shaft causes the nut member to advance along the threads of the shaft upwardly or downwardly, depending upon the direction of rotation of the working string. This, in turn, causes the expander tool to be translated upwardly or downwardly within the wellbore. In this manner, the expander tool can be selectively raised or lowered without raising or lowering the working string itself.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
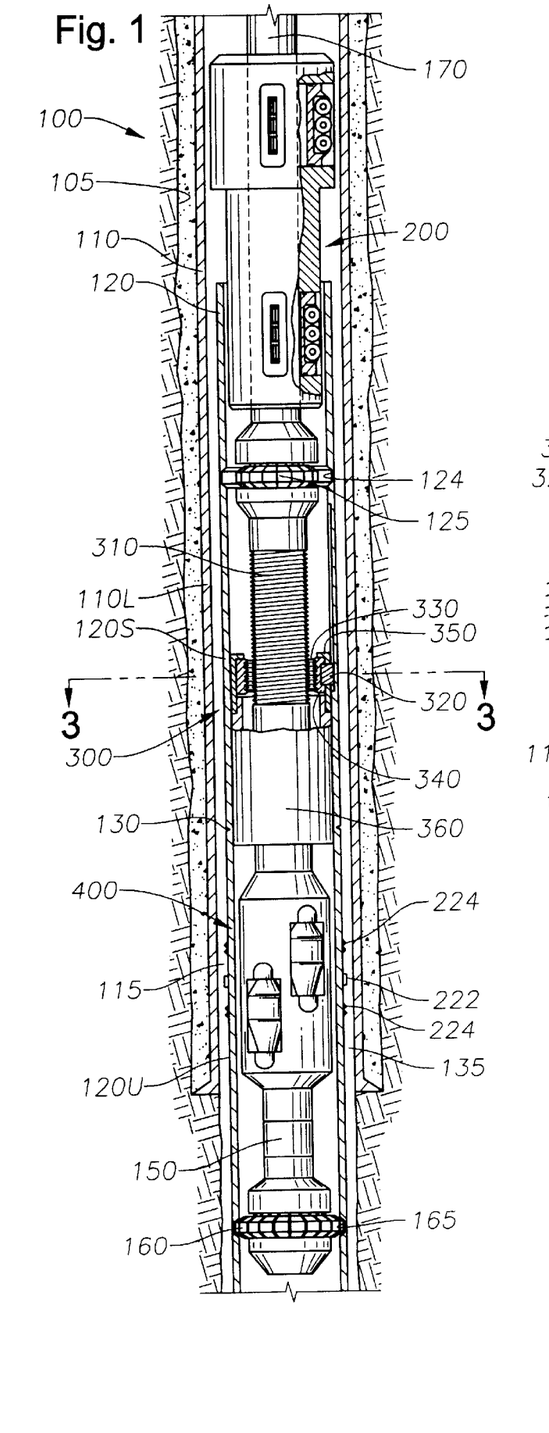
FIG. 1 is a cross-sectional view of a wellbore having an upper string of casing, and a lower string of casing being lowered into the upper string of casing. In this view, the lower string of casing serves as the expandable tubular. Also depicted in FIG. 1 is a threaded translation apparatus of the present invention for translating an expander tool.

FIG. 1 presents a cross-sectional view of a wellbore 100 having an upper string of casing 110 and a lower string of casing 120. The lower string of casing 120, or liner, is being lowered into the wellbore 100 co-axially with the upper string of casing 110. The lower string of casing 120 is positioned such that an upper portion 120U of the lower string of casing 120 overlaps with a lower portion 110L of the upper string of casing 110.

In the example of FIG. 1, the lower string of casing 120 serves as an expandable tubular. The lower string of casing 120 will be hung off of the upper string of casing 110 by expanding the upper portion 120U of the lower string of casing 110 into the lower portion 110L of the upper string of casing 110. However, it is understood that the apparatus and method of the present invention may be utilized to expand downhole tubulars other than strings of casing.

A sealing member 222 is preferably disposed on the outer surface of the lower string of casing 120. In the preferred embodiment, the sealing member 222 defines a matrix formed in grooves (not shown) on the outer surface of the lower string of casing 120. However, other configurations are permissible, including one or more simple rings formed circumferentially around the lower string of casing 120.

The sealing member 222 is fabricated from a suitable material based upon the service environment that exists within the wellbore 100. Factors to be considered when selecting a suitable sealing member 222 include the chemicals likely to contact the sealing member, the prolonged impact of hydrocarbon contact on the sealing member, the presence and concentration of erosive compounds such as hydrogen sulfide or chlorine, and the pressure and temperature at which the sealing member must operate. In a preferred embodiment, the sealing member 222 is fabricated from an elastomeric material. However, non-elastomeric materials or polymers may be employed as well, so long as they substantially prevent production fluids from passing upwardly between the outer surface of the lower string of casing 120U and the inner surface of the upper string of casing 110 after the expandable section 120U of the casing 120 has been expanded.

Also positioned on the outer surface of the lower string of casing 120 is at least one slip member 224. The slip member 224 is used to provide an improved grip between the expandable tubular 120U and the upper string of casing 110 when the lower string of casing 120 is expanded. In this example, the slip member 224 defines a plurality of carbide buttons interspersed within the matrix of the sealing member 222. However, any suitable placement of a hardened material which provides a gripping means for the lower string of casing 120 into the upper string of casing 110 may be used. For example, a simple pair of rings having grip surfaces (not shown) formed thereon for engaging the inner surface of the upper string of casing 110 when the lower string of casing 120 is expanded would be suitable. The size, shape and hardness of the slips 224 are selected depending upon factors well known in the art such as the hardness of the inner wall of casing 110, the weight of the casing string 120 being hung, and the arrangement of slips 224 used.

Figure 5:
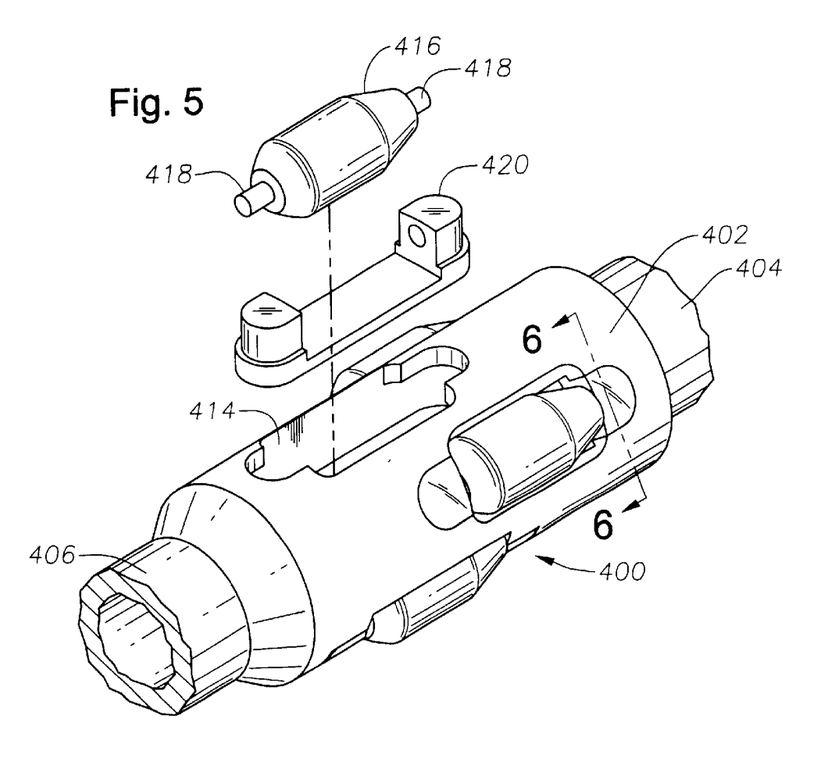
FIG. 5 presents an exploded view of an expander tool as might be translated by the threaded apparatus of the present invention.
Figure 6:
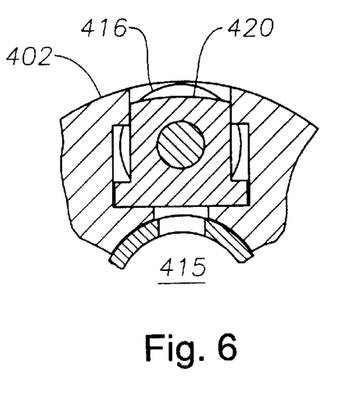
FIG. 6 presents a portion of the expander tool of FIG. 5 in cross-section, with the view taken across line 6—6 of FIG. 5.

In order to expand the lower string of casing 120 seen in FIG. 1, an expander tool 400 is provided. An expander tool as might be used in the expansion assembly is seen more fully in FIG. 5. FIG. 5 is an exploded view of an exemplary expander tool 400. FIG. 6 presents the same expander tool 400 in cross-section, with the view taken across line 6—6 of FIG. 5.

The expander tool 400 has a body 402 which is hollow and generally tubular. Connectors 404 and 406 are provided at opposite ends of the body 402 for connection to other components (not shown) of a downhole assembly. The connectors 404 and 406 are of a reduced diameter (compared to the outside diameter of the body 402 of the tool 400). The hollow body 402 allows the passage of fluids through the interior of the expander tool 400 and through the connectors 404 and 406. The central body 402 has a plurality of recesses 414 to hold a respective roller 416. Each of the recesses 414 has parallel sides and holds a roller 416 capable of extending radially from the radially perforated tubular core 415 of the tool 400.

In one embodiment of the expander tool 400, rollers 416 are near-cylindrical and slightly barreled. Each of the rollers 416 is supported by a shaft 418 at each end of the respective roller 416 for rotation about a respective rotational axis. The rollers 416 are generally parallel to the longitudinal axis of the tool 400. The plurality of rollers 416 are radially offset at mutual circumferential separations around the central body 402. In the arrangement shown in FIG. 5, only a single row of rollers 416 is employed. However, additional rows may be incorporated into the body 402, as shown in FIG. 1.

The rollers 416 illustrated in FIG. 5 have generally cylindrical or barrel-shaped cross sections; however, it is to be appreciated that other roller shapes are possible. For example, a roller 416 may have a cross sectional shape that is conical, truncated conical, semi-spherical, multifaceted, elliptical or any other cross sectional shape suited to the expansion operation to be conducted within the tubular 170.

Each shaft 418 is formed integral to its corresponding roller 416 and is capable of rotating within a corresponding piston 420. The pistons 420 are radially slidable, one piston 420 being slidably sealed within each radially extended recess 414. The back side of each piston 420 is exposed to the pressure of fluid within the hollow bore 415 of the tool 400. In this manner, pressurized fluid provided from the surface of the well can actuate the pistons 420 and cause them to extend outwardly whereby the rollers 416 contact the inner surface of the tubular 120U to be expanded.

The expander tool 400 is preferably designed for use at or near the end of a working string 170. In order to actuate the expander tool 400, fluid is injected into the working string 170. Fluid under pressure then travels downhole through the working string and into the perforated tubular bore 415 of the tool 400. From there, fluid contacts the backs of the pistons 420. As hydraulic pressure is increased, fluid forces the pistons 420 from their respective recesses 414. This, in turn, causes the rollers 416 to make contact with the inner surface of the liner 120U. Fluid finally exits the expander tool 400 through connector 406 at the base of the tool 400. The circulation of fluids to and within the expander tool 400 is regulated so that the contact between and the force applied to the inner wall of liner 120U is controlled. The pressurized fluid causes the piston assembly 420 to extend radially outward so as to place the rollers 416 into contact with the inner surface of the lower string of casing 120U. With a predetermined amount of fluid pressure acting on the piston surface 420, the lower string of casing 120U is expanded past its elastic limits.

As noted, a fluid outlet 406 is provided at the lower end of the expander tool 400. The fluid outlet 406 serves not only as a connector, but also as a fluid conduit for cement to be circulated into the wellbore 100 so that the lower string of casing 120 can be cemented into the wellbore 100 during the well completion process.

The lower connector 406 of the expander tool 400 is connected to a swivel 150. The swivel 150 permits the expander tool 400 to rotate without rotating other tools downhole. The swivel 150 is shown schematically in FIG. 1 as a separate downhole tool. However, it is preferred that the swivel 150 simply be incorporated into the expander tool 400 using a bearing-type connection (not shown).

A means is needed in order to translate the expander tool 400 within the wellbore 100 during expansion operations. To accomplish this, the present invention provides a novel threaded apparatus 300 for translating an expander tool 400 axially. As will be explained, rotation of a shaft 310 of the threaded apparatus 300 serves to translate the expander tool 400 vertically within the wellbore 100 along a desired length. This translation occurs while the expander tool 400 is in its actuated state. In this manner, the upper portion 120U of the lower string of casing 120 is placed in permanent frictional contact with the bottom portion 110L of the upper string of casing 110 along a desired length.

Figure 3:
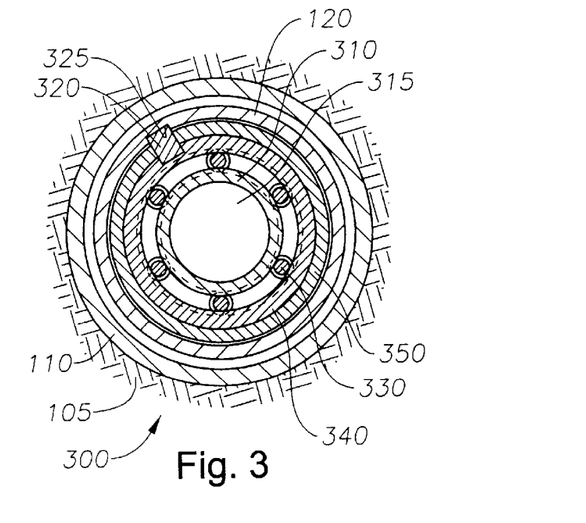
FIG. 3 is a cross-sectional view of the threaded translation apparatus of the present invention, taken across line 3—3 of FIG. 1.
Figure 4:
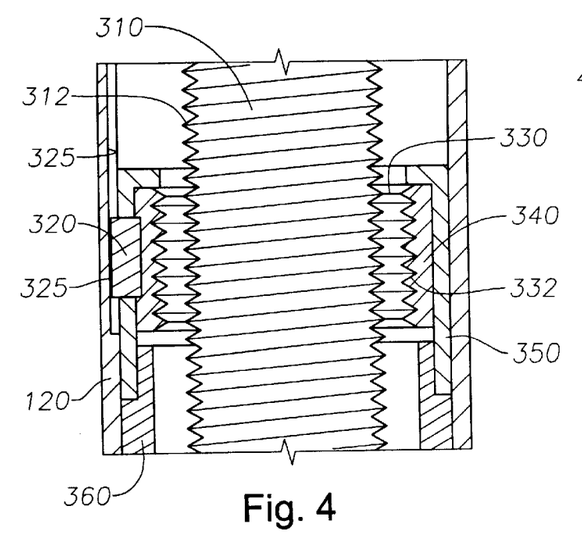
FIG. 4 is an enlarged sectional view of the threaded connection between the shaft and the recess of the present invention.

FIG. 3 provides a cross-sectional view of the threaded apparatus 300 of the present invention. The cut is taken across line 3—3 of FIG. 1. FIG. 4 presents a cut-away view of a portion of a threaded translation apparatus 300. Together, FIGS. 3 and 4 present the threaded apparatus 300 more fully.

As shown, the threaded apparatus 300 first comprises a shaft 310 having helical threads 312. The shaft 310 includes a bore 315 running axially therethrough from a top end to a bottom end. The bore 315 serves as a fluid conduit for fluid pumped into the wellbore 100 from the surface.

Below the threaded shaft 310 is an elongated recess 360. The recess 360 defines a tubular member having a top end and a bottom end. The recess 360 is preferably configured to be able to substantially encompass the shaft member 310. As will be more fully explained, the recess 360 receives the threaded shaft 310 when the shaft 310 is rotated.

Within the elongated recess 360 is a nut 340. The nut 340 is preferably disposed near the top of the recess 360. The nut 340 encircles the shaft 310, and engages the shaft 310 by means of threads 332 which ride upon the threads 312 of the shaft 310. In the embodiment shown in FIG. 4, the nut 340 is a roller drive nut, meaning it employs a plurality of threaded rollers 330 disposed between the internally threaded nut body 340 and the shaft 310. The threaded rollers 330 engage and ride along the shaft 310 when the shaft 310 is rotated. In this respect, the threads of the nut 340 define separate roller members 330 which themselves have threads 332.

It is to be appreciated that the threaded translational apparatus 300 shown in FIG. 4 is but one example. Numerous arrangements for incrementally advancing a nut member along a shaft exist, including ringed drive arrangements, ball screw mechanisms, roller screw mechanisms, lead screw arrangements, and a planetary mechanism. Thus, the term "nut" or "nut member" in the present invention utilizes any mechanism which provides for the incremental advancement of one member along a shaft by relative rotational movement between the nut member and the shaft. Likewise, the term "shaft" includes any threaded elongated member which permits the incremental advancement of a nut member. It is further within the scope of the present invention to provide numerous arrangements for threads on a lead screw or other shaft, including but not limited to ACME threads, two-pitch threads, shouldered threads, and tapered threads.

The nut 340 shown in FIG. 4 is designed to be non-rotational. In this arrangement, the nut housing 350 circumferentially encloses the nut 340. At the same time, the nut 340 is affixed to the recess 360 by the nut housing 350. The shaft 310 rotates within the nut 340. Thus, rotation of the shaft 310 causes the nut 340 to be translated axially along the wellbore 100. Translation of the nut, in turn, translates the elongated recess 360 attached thereto.

In one arrangement, the nut housing 350 may be affixed to the recess 360 within the inner diameter of the recess 360. Alternatively, and as shown FIGS. 3 and 4, the nut housing 350 is affixed to the recess 360 at the top end of the recess 360. In this arrangement, the circumference of the nut housing 350 is generally dimensioned in accordance with the circumference of the recess 360. In either arrangement, when the nut 340 is translated within the wellbore 100, the recess 360 is translated as well.

As shown in FIG. 4, the nut housing 350 has a top end and a bottom end. In the embodiment of FIG. 4, the bottom end of the nut housing 350 is connected to the top end of the recess 360 by a threaded connection. In turn, the bottom end of the recess 360 is connected to the top connector 404 of the expander tool 400. Thus, rotation of the shaft 310 not only translates the recess 360 within the wellbore, but the expander tool 400 as well.

In one aspect, the nut member 340 is rotationally fixed within the wellbore 100 by means of a key 320. The key 320 is placed within the circumferences of the nut 340 and the nut housing 350. Further, the key 320 is landed along an elongated spline 325 machined into the lower string of casing 120. The placement of the key 320 in the spline 325 is shown in the cross-sectional view of FIG. 3.

In operation, the translation apparatus 300 of the present invention is run into the wellbore 100 on the lower end of a working string 170. As seen in FIG. 1, the translation tool 300 is connected to the expander tool 400 at one end. In the arrangement shown in FIG. 1, the translation apparatus 300 is connected at the top of the expander tool 400. However, it will be appreciated that the threaded translation apparatus 300 will also function if the threaded apparatus 300 is below the expander tool 400.

In order to accomplish the expansion operation in a single trip, the working string 170 also is temporarily connected to the lower string of casing 120. In this manner, the lower string of casing 120 can be introduced into the wellbore 100 at the same time as the expander tool 400 and the translation tool 300. In FIG. 1, a collet 160 is presented as the releasable connection. The collet 160 is shown near the end of the working string 170. The collet 160 is landed into a radial profile 165 within the lower string of casing 120 so as to support the lower string of casing 120. The collet 160 is mechanically or pneumatically actuated as is known in the art, and supports the lower string of casing 120 until such time as the lower string of casing 120 has been expandably set by actuation of the expander tool 400.

Figure 7:
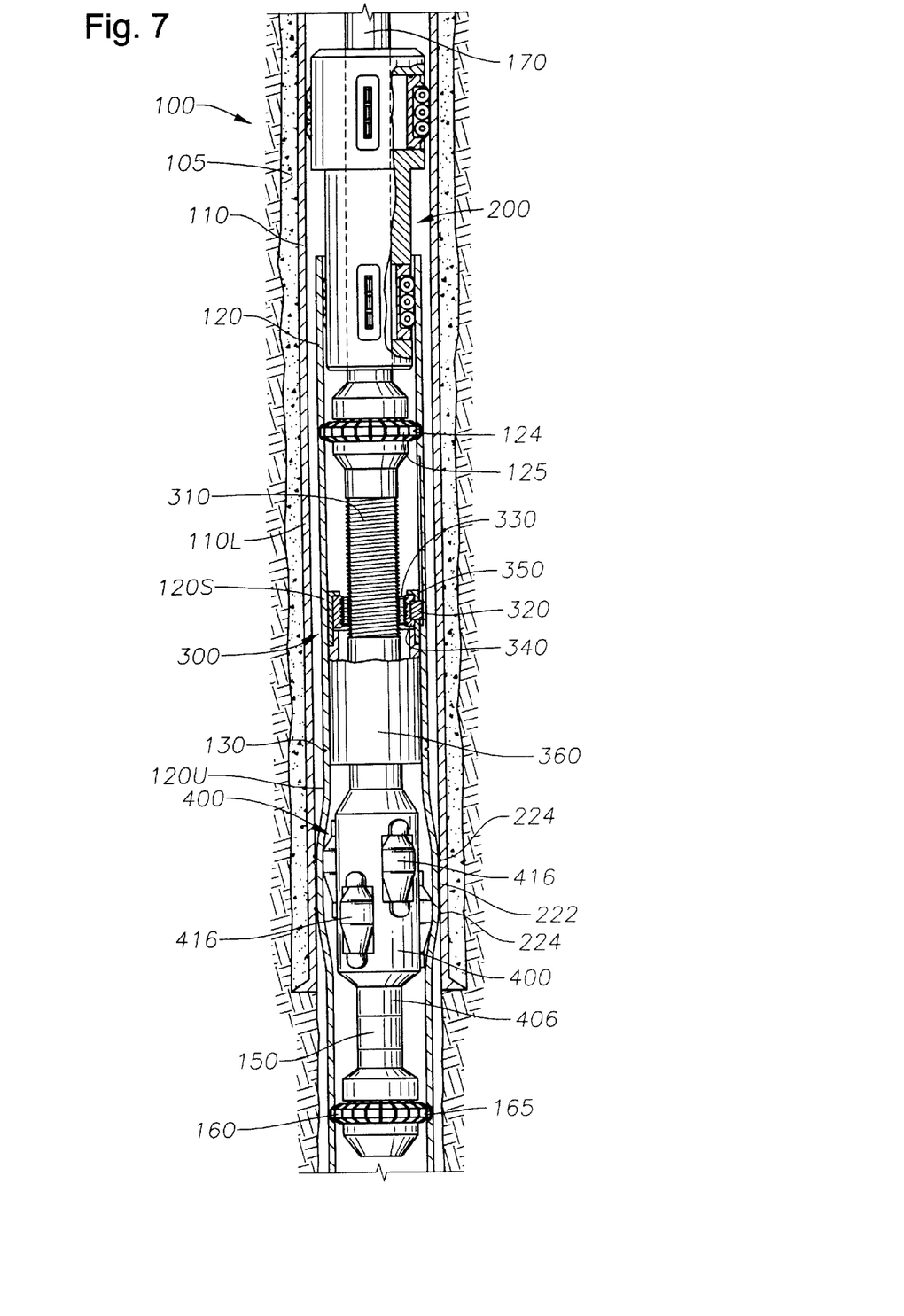
FIG. 7 depicts the wellbore of FIG. 1. In this view, the expander tool has been actuated so as to begin expanding the lower string of casing.

FIG. 7 depicts the wellbore of FIG. 1, in which the expander tool 400 has been actuated. It can be seen that an initial portion of the lower string of casing 120 has been expanded. As explained above, actuation of the expander tool 400 is by injection of fluid under pressure into the working string 170. Fluid travels from the surface, down the working string 170, through the bore 315 of the shaft 310, and through the bore 415 of the expander tool 400.

Figure 8:
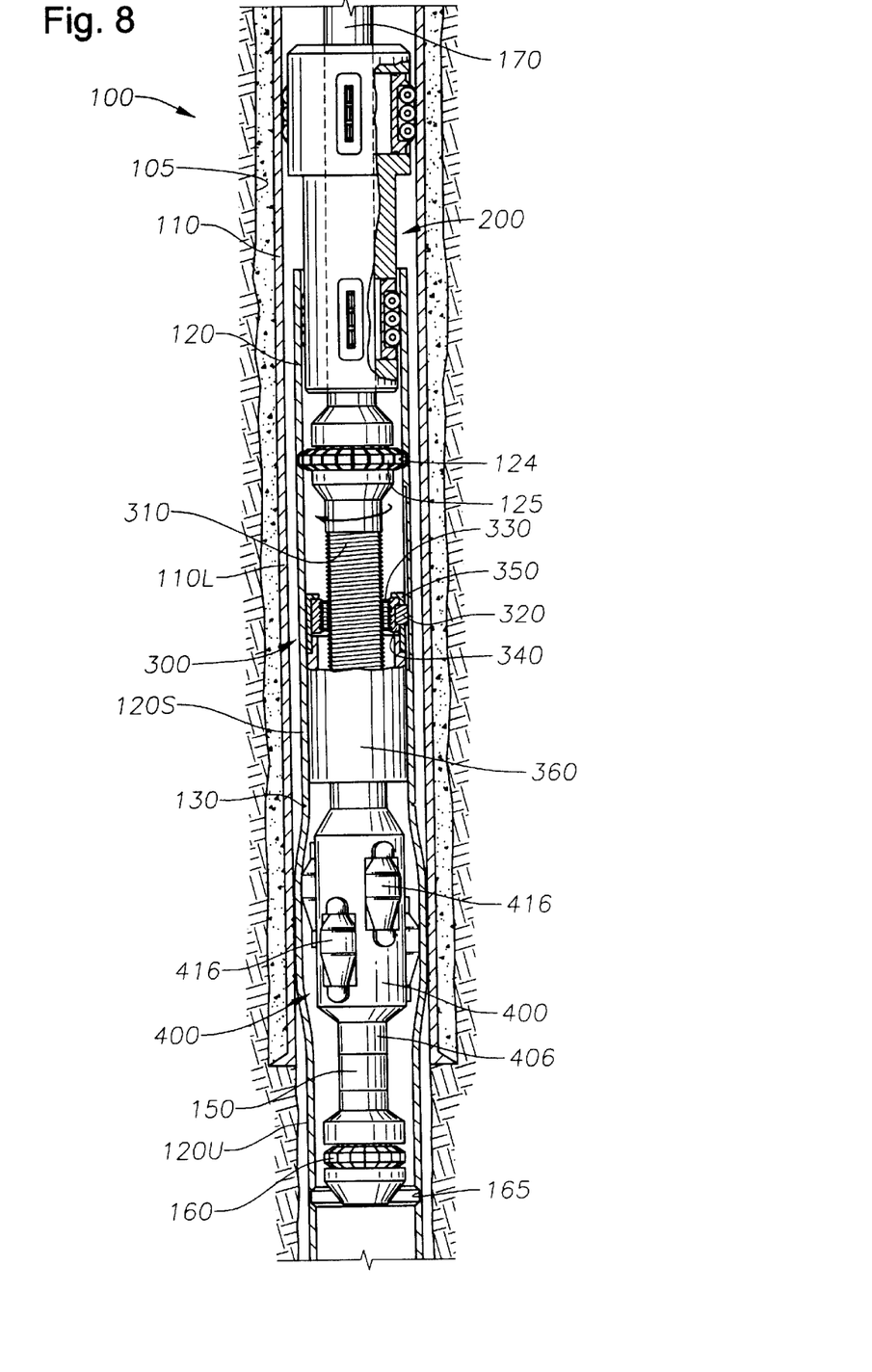
FIG. 8 depicts the wellbore of FIG. 7. In this view, the expander tool remains actuated, but the lower collet has been released from the liner. The working string has been rotated so as to begin raising the expander tool within the wellbore. Rotation of the working string rotates a threaded shaft within the threaded translation apparatus of the present invention, which in turn causes the expander tool to be translated co-axially within the wellbore

FIG. 8 depicts the wellbore 100 of FIG. 7. In this view, the expander tool 400 remains actuated, but the collet 160 has been released from the liner 120. This allows the expander tool 400 to move within the wellbore 100 independent of the liner 120. Also, in FIG. 8, the working string 170 has been rotated so as to begin raising the expander tool 400 within the wellbore 100. As described above, rotation of the working string 170 causes the recess 360 and, therewith, the expander tool 400 to be translated axially within the wellbore 100. FIG. 8 thus demonstrates the expander tool 400 being raised within the wellbore 100 by actuation of the threaded apparatus 300.

It is contemplated in FIG. 1 that rotation of the shaft 310 and of the expander tool 400 is accomplished by rotating the working string, i.e., drill pipe 170, from the surface. However, rotation may also be achieved by activation of a downhole rotary motor, such as a mud motor (not shown).

Figure 9:
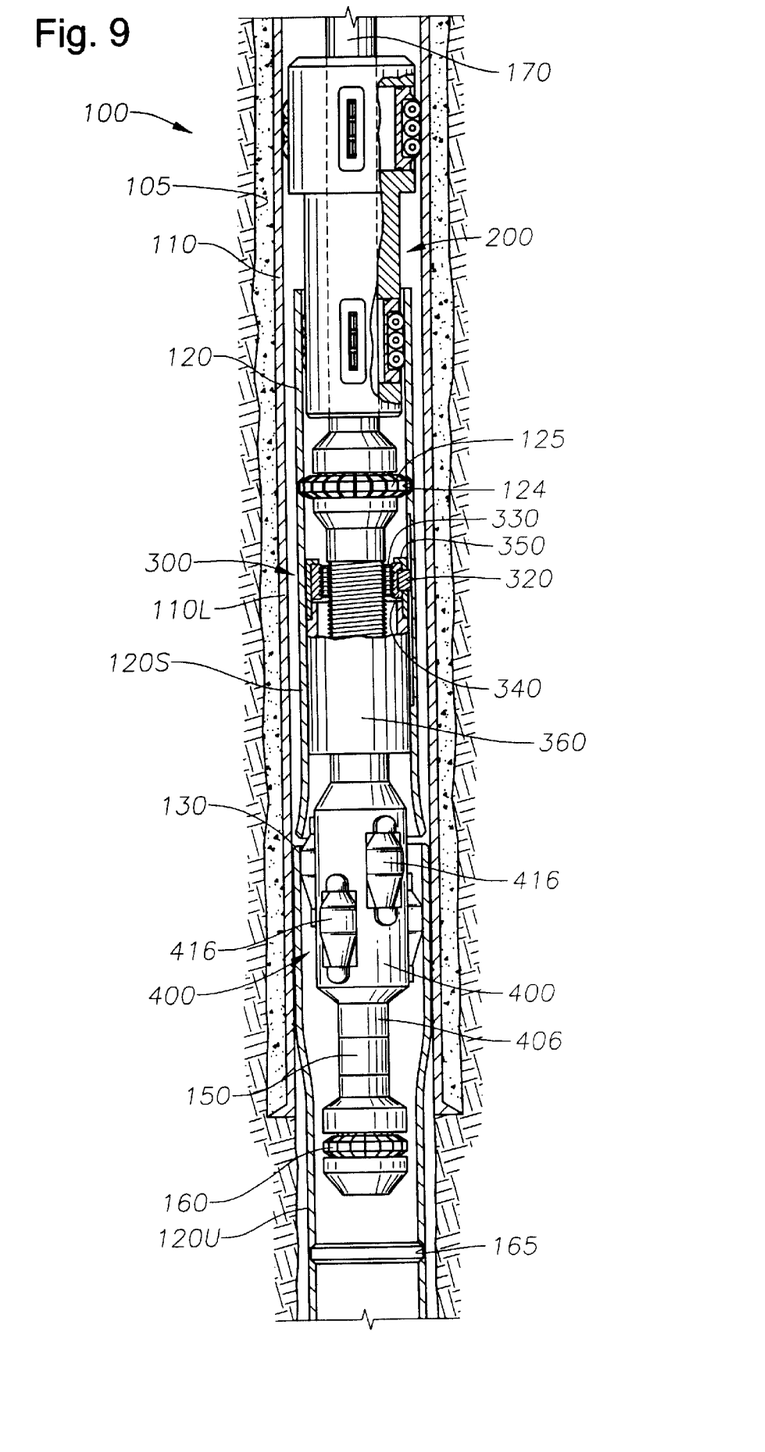
FIG. 9 depicts the wellbore of FIG. 8. Here, the expander tool has been raised further along the threaded shaft so as to expand the lower string of casing into the surrounding upper string of casing along a desired length. The portion of the lower string of casing having a scribe has been expanded, causing severance of the lower string of casing.

FIG. 9 depicts the wellbore 100 of FIG. 8. Here, the actuated expander tool 400 has been raised further along the threaded shaft 310 so as to expand the lower string of casing 120 into the surrounding upper string of casing 110 along a desired length. This, in turn, results in an effective hanging and sealing of the lower string of casing 120 upon the upper string of casing 110 within the wellbore 100. Thus, the apparatus 300 enables a lower string of casing 120 to be hung onto an upper string of casing 110 by expanding the lower string 120 into the upper string 110, and without raising or lowering the working string 170 from the surface during expansion operations. It is understood, however, that the working string 170 may optionally be raised and lowered while the expander tool 400 is still actuated and after the initial expansion has taken place, i.e, after the expander tool 400 has been initially actuated.

As stated above, the threaded translational apparatus 300 shown in FIG. 4 is but one example. Other arrangements for selectively translating an expander tool along a threaded apparatus exist. For example, it is within the spirit and scope of the present invention to translate an expander tool by rotating an attached nut member, rather than by rotating an attached shaft. In such an arrangement, for example, a nut member would be rotated within an elongated, internally threaded, non-rotating recess. The recess would, in one instance, extend upward from the body 402 of the expander tool 400. In this way, rotation of the nut member would drive the recess and the attached expander tool axially within the wellbore. Thus, it is within the scope of the present invention to provide a nut member which rides upon threads of any elongated threaded body by relative rotational movement between the nut member and the elongated threaded body.

Figure 10:
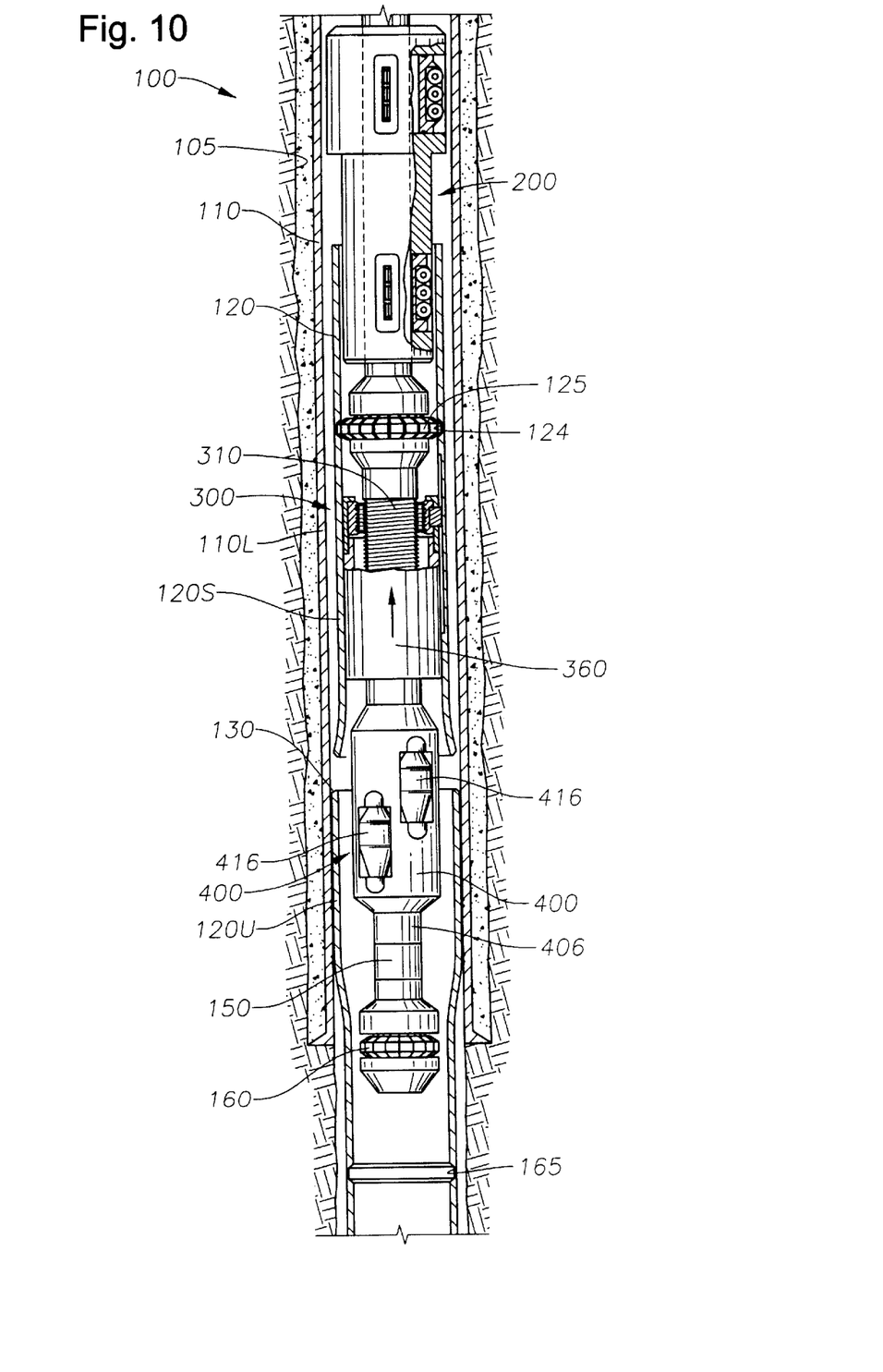
FIG. 10 is a partial section view of the wellbore of FIG. 9. In this view, the torque anchor and the expander tool have been de-actuated. Also, the expansion assembly is being removed from the wellbore. Removal of the expansion assembly brings with it the severed upper portion of the lower casing string.

Following expansion operations, hydraulic pressure from the surface is relieved, allowing the pistons 420 to return to the recesses 414 within the body 402 of the tool 400. The expander tool 400 and the threaded translation apparatus 300 can then be withdrawn from the wellbore 100 by pulling the run-in tubular 170. FIG. 10 is a partial section view of the wellbore 100 of FIG. 9. In this view, the expander tool 400 has been de-actuated and is being removed from the wellbore 100 along with the expansion assembly 400.

The portion 120S of the lower string of casing 120 adjacent to the shaft member 310 must also be removed from the wellbore 100. To accomplish this, typical casing severance operations may be conducted. This would be done via a subsequent trip into the wellbore 100. However, as an alternative shown in FIG. 10, the portion 120S of the lower string of casing 120 adjacent to the shaft member 310 may be removed from the wellbore 100 at the same time as the expander tool 400. In order to employ this method, a novel scribe 130 is formed on the outer surface of the lower string of casing 120.

Figure 2:
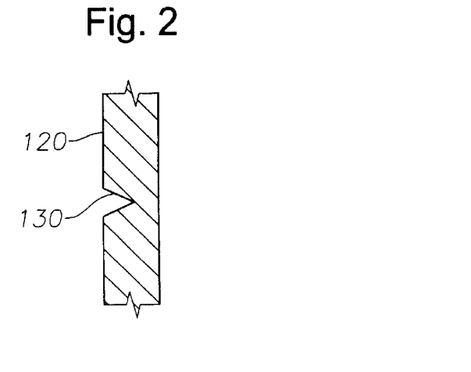
FIG. 2 is a more detailed view of a scribe as might be placed in the lower string of casing. The scribe serves as a point of structural weakness in the casing, permitting severance upon expansion of the casing.

An enlarged view of the scribe 130 in one embodiment is shown in FIG. 2. The scribe 130 defines a cut made into the outer surface of the lower string of casing 120. The scribe 130 is preferably placed around the casing 120 circumferentially. The depth of the cut 130 needed to cause the break is dependent upon a variety of factors, including the tensile strength of the tubular, the overall deflection of the material as it is expanded, the profile of the cut, and the weight of the tubular being hung. The scribe 130 must be shallow enough that the tensile strength of the tubular 120 supports the weight below the scribe 130 during run-in. The arrangement shown in FIG. 2 employs a single scribe 130 having a V-shaped profile so as to impart a high stress concentration onto the casing wall. However, other profiles may be employed.

The scribe 130 creates an area of structural weakness within the lower casing string 120. When the lower string of casing 120 is expanded at the depth of the scribe 130, the lower string of casing 120 is cleanly severed. The severed portion 120S of the lower casing string 120 can then be easily removed from the wellbore 100. Thus, the scribe 130 may serve as a release mechanism for the lower casing string 120. Other means for severing the tubular 120 upon expansion may be developed as well.

In order to remove the severed portion 120S of the lower string of casing 120 from the wellbore 100, a second connection must be provided with the severed portion of the lower string of casing 120. In the arrangement of FIG. 1, a connector 124 is shown. The connector 124 is demonstrated as a collet 124 to be landed into a radial profile 125 within the lower string of casing 120U. In FIG. 1 and in FIG. 10, the collet 124 is shown as being actuated, and as supporting the upper portion 120S of the lower string of casing 120. The collet 124 is mechanically or pneumatically actuated as is known in the art, and supports the severed portion 120S of the lower string of casing 120 while the threaded apparatus 300 and the expander tool 400 are being removed from the wellbore 100. Removal of the expander tool 400 brings with it the severed portion 120S of the lower casing string 120.

Figure 11:
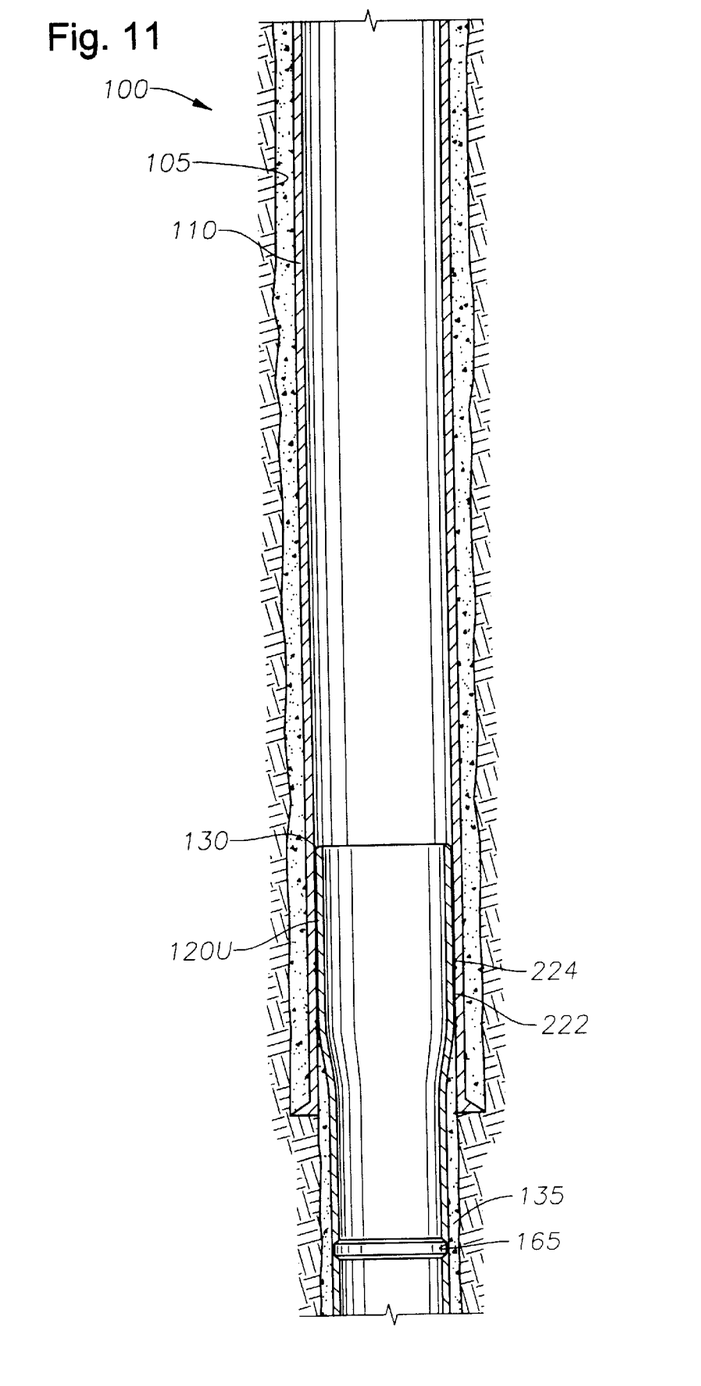
FIG. 11 is a partial section view of the wellbore of FIG. 10, with the threaded apparatus of the present invention having been removed. In this view, the lower string of casing has been expanded into frictional and sealing engagement with the upper string of casing.

FIG. 11 is a partial section view of the wellbore 100 of FIG. 10. In this view, the threaded translation apparatus 300 of the present invention and the expander tool 400 have been removed. It can be seen that the lower string of casing 120U has been expanded into frictional and sealing engagement with the upper string of casing 110. The seal member 222 and the slip member 224 are engaged to the inner surface of the upper string of casing 110. Further, the annulus 135 between the lower string of casing 120 and the upper string of casing 110 has been filled with cement, excepting that portion of the annulus which has been removed by expansion of the lower string of casing 120U.

As a further aid in the expansion of the lower casing string 120, a torque anchor may optionally be utilized. Those of ordinary skill in the art may perceive that the radially outward force applied by the rollers 416, when combined with rotation of the expander tool 400, might cause some unwanted rotation of the casing 120. The torque anchor serves to prevent rotation of the lower string of casing 120 during the expansion process.

Figure 12:
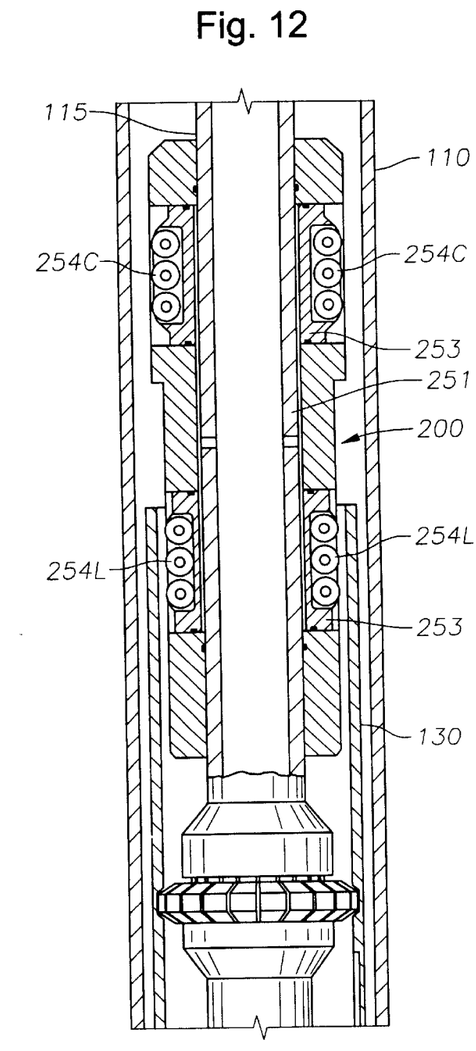
FIG. 12 is a more detailed, sectional view of a torque anchor as might be used during an expansion operation. In this view, the torque anchor is in its run-in position.

The wellbore 100 of FIG. 1 includes a torque anchor 200 positioned at the top of the lower string of casing 120. In that view, the torque anchor 200 is not actuated in order to facilitate run-in of the tools 200, 300, 400 and the lower casing string 120. FIG. 12 presents a more detailed, sectional view of a torque anchor 200 as might be used during an expansion operation. In this view, the torque anchor 400 again is in its run-in position.

In this arrangement, the torque anchor 200 defines a body having sets of wheels 254C and 254L radially disposed around its perimeter. The wheels 254C and 254L reside within wheel housings 253, and are oriented to permit axial (vertical) movement, but not radial movement, of the torque anchor 200. Sharp edges (not shown) along the wheels 254C and 254L aid in inhibiting radial movement of the torque anchor 200. In the preferred embodiment, four sets of wheels 254C and 254L are employed to act against the upper casing 110 and the lower casing 120 strings, respectively.

Figure 13:
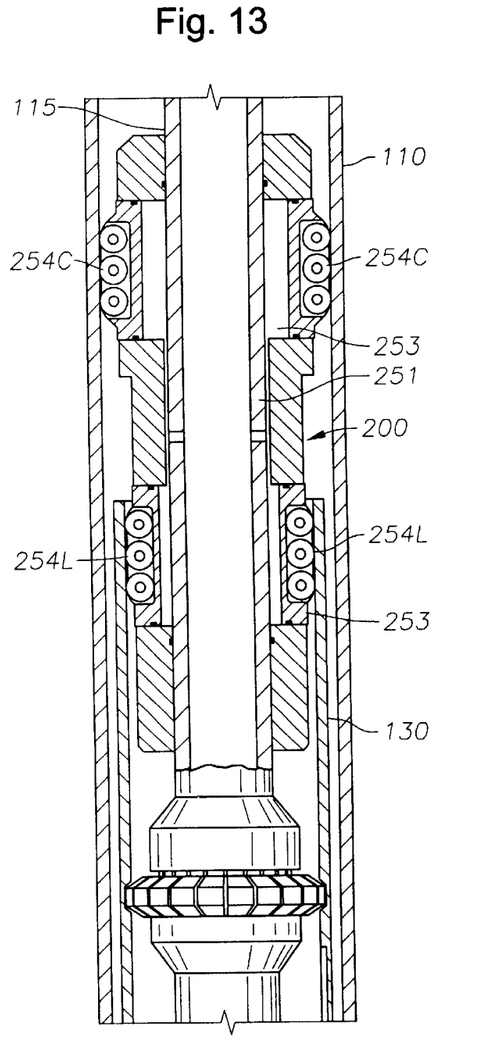
FIG. 13 is a cross-sectional view of the torque anchor of FIG. 12. In this view, the wheels of the torque anchor have been actuated so as to prevent rotational movement of the lower string of casing during initial expansion thereof.

The torque anchor 200 is run into the wellbore 100 on the working string 170 along with the expander tool 400 and the lower casing string 120. The run-in position of the torque anchor 200 is shown in FIG. 12. In this position, the wheel housings 253 are maintained essentially within the torque anchor body 200. Once the lower string of casing 120 has been lowered to the appropriate depth within the wellbore 100, the torque anchor 200 is activated. Fluid pressure provided from the surface through the working tubular 170 acts against the wheel housings 253 to force the wheels 254C and 254L outward from the torque anchor body 200. Wheels 254C act against the inner surface of the upper casing string 110, while wheels 254L act against the inner surface of the lower casing string 120. This activated position is depicted in FIG. 13.

A rotating sleeve (not shown) resides longitudinally within the torque anchor 200. The sleeve 251 rotates independent of the torque anchor body 200. Rotation is imparted by the working tubular 170. In turn, the sleeve provides the rotational force to rotate the threaded shaft 310 and the expander tool 400.

After the lower casing string 120 has been expanded into frictional contact with the inner wall of the upper casing string 110, the expander tool 400 is deactivated. In this regard, fluid pressure supplied to the pistons 420 is reduced or released. Reduction of hydraulic pressure to the expander tool 400 further serves to de-actuate the optional torque anchor 200.

While the foregoing is directed to embodiments of the present invention, other and further embodiments of the invention may be devised without departing from the basic scope thereof, and the scope thereof is determined by the claims that follow.

What is claimed is:

1. An apparatus for translating an expander tool axially within a wellbore in order to facilitate the expansion of a first tubular into a surrounding second tubular, the apparatus comprising:
   a shaft;
   a nut member disposed at a point around said shaft, said nut member advancing axially along said shaft upon rotation of said shaft; and
   a recess connected at an end to said nut member, said recess receiving said shaft when said nut member is advanced along said shaft.

2. The apparatus of claim 1, wherein said shaft further comprises:
   a bore therein; and
   helical threads disposed externally along said shaft.

3. The apparatus of claim 2, wherein said nut member has threads which ride on said helical threads of said shaft.

4. The apparatus of claim 3, wherein said nut member comprises:
   an internally threaded nut body; and
   a plurality of threaded roller members disposed between said nut body and said threaded shaft.

5. The apparatus of claim 3, wherein said helically threaded shaft and said nut member define a roller screw mechanism.

6. The apparatus of claim 3, wherein said helically threaded shaft is a square cut thread.

7. The apparatus of claim 3, wherein said helically threaded shaft and said nut member define a mechanism selected from the group consisting essentially of a ball screw mechanism, a roller screw mechanism, a lead screw arrangement, and a planetary mechanism.

8. The apparatus of claim 3, wherein:
   said shaft is rotated by a working string within the wellbore;
   said first tubular defines a lower string of casing; and
   said second tubular defines an upper string of casing.

9. The apparatus of claim 8, wherein said nut member further comprises a nut housing around said nut member, said nut housing having a top end and a bottom end.

10. The apparatus of claim 9, further comprising a key disposed within the circumference of said nut body and said nut housing, said key extending from the nut housing into a spline fabricated into the inner surface of the lower string of casing so as to prevent rotational movement of the nut when said shaft is rotated.

11. The apparatus of claim 8, wherein said recess has a top end and a bottom end, said nut member being connected to said recess proximate to said top end, and said bottom end of said recess being connected to a rotary expander tool.

12. The apparatus of claim 8, wherein said recess has a top end and a bottom end, said top end of said recess being connected to a rotary expander tool, and said bottom end of said recess being connected to said nut member.

13. The apparatus of claim 3, wherein:
   said shaft is rotated by a mud motor within the wellbore;
   said first tubular defines a lower string of casing; and
   said second tubular defines an upper string of casing.

14. The apparatus of claim 1, wherein said nut member defines a planetary mechanism which is advanced incrementally along said shaft.

15. An apparatus for translating an expander tool axially within a wellbore in order to facilitate the expansion of a lower string of casing into a surrounding upper string of casing, the apparatus comprising:
   a helically threaded shaft having an internal bore;
   a nut member disposed at a point around said shaft, said nut advancing axially along said shaft upon rotation of said shaft; said nut member comprising an internally threaded nut body and a plurality of threaded roller members engaging and riding upon said shaft between said shaft and said nut body;
   a nut housing around said nut member, said nut housing having a top end and a bottom end; and
   a recess having a top end and a bottom end, said recess being connected to said nut housing, the recess receiving said shaft when said nut is advanced along said shaft.

16. The apparatus of claim 15, wherein said top end of said recess is connected to said bottom end of said nut housing, and said bottom end of said recess is connected to a rotary expander tool.

17. The apparatus of claim 16, further comprising a key disposed within the circumference of said nut body and said nut housing, said key extending from the nut housing into a spline fabricated into the inner surface of the lower string of casing so as to prevent rotational movement of the nut when said shaft is rotated.

18. The apparatus of claim 15, wherein said helically threaded shaft and said nut member define a roller screw mechanism.

19. The apparatus of claim 15, wherein said helically threaded shaft is a square cut thread.

20. The apparatus of claim 19, wherein said helically threaded shaft is an ACME thread.

21. An apparatus for translating an expander tool axially within a wellbore in order to facilitate the expansion of a first tubular into a surrounding second tubular, the apparatus comprising:
   an elongated threaded body; and
   a nut member disposed at a point along the threaded body, the nut member advancing axially along the threaded body upon rotation of the nut member on the threaded body so as to translate the expander tool within the wellbore.

22. The apparatus of claim 21, wherein the expander tool is connected to the threaded body.

23. The apparatus of claim 22, wherein the threaded body defines an internally threaded, non-rotating body which receives the nut member.

24. A method for expanding a first tubular body into a second tubular body within a wellbore, comprising the steps of:
   attaching an expander tool to an apparatus for translating the expander tool, the apparatus for translating the expander tool comprising:
   an elongated threaded body; and
   a nut member disposed at a point along the threaded body, the nut member advancing axially along the threaded body upon relative rotational movement between the nut member and the threaded body;
   attaching the apparatus for translating the expander tool to a first tubular body,
   running the first tubular body and attached translating apparatus into the wellbore on a working string so that at least a portion of the first tubular body is disposed within the second tubular body;
   actuating the expander tool so as to radially expand a portion of the first tubular body into frictional engagement with the surrounding second tubular body;
   actuating the apparatus for translating the expander tool by causing relative rotational movement between the elongated threaded body and the nut member so as to translate the expander tool within the wellbore along a desired length.

25. The method of claim 24, wherein the apparatus for translating an expander tool further comprises a recess connected to the nut member, the recess receiving the threaded body when the nut member is advanced along the threaded body.

26. The method of claim 25, wherein the recess has a top end and a bottom end, the nut member being connected to the recess proximate to the top end, and the bottom end of the recess being connected to the expander tool.

27. The method of claim 24, wherein the nut member comprises:
   an internally threaded nut body; and
   a plurality of threaded roller members disposed between the nut body and the threaded body.

28. The method of claim 24, wherein the threaded body and the nut member define a mechanism selected from the group consisting essentially of a ball screw mechanism, a roller screw mechanism, a lead screw arrangement, and a planetary mechanism.

29. The method of claim 24, wherein relative rotational movement between the threaded body and the nut member is accomplished by rotating the working string within the wellbore to impart rotational movement to the threaded body.

30. The method of claim 24, wherein relative rotational movement between the threaded body and the nut member is accomplished by rotating the working string within the wellbore to impart rotational movement to the nut member.

* * * * *